US011328019B2

(12) United States Patent
Bonin et al.

(10) Patent No.: US 11,328,019 B2
(45) Date of Patent: May 10, 2022

(54) PROVIDING CAUSALITY AUGMENTED INFORMATION RESPONSES IN A COMPUTING ENVIRONMENT

(71) Applicant: INTERNATIONAL BUSINESS MACHINES CORPORATION, Armonk, NY (US)

(72) Inventors: Francesca Bonin, Dublin (IE); Debasis Ganguly, Dublin (IE); Charles Arthur Jochim, Dublin (IE); Pierpaolo Tommasi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/839,930

(22) Filed: Apr. 3, 2020

(65) Prior Publication Data
US 2021/0311996 A1 Oct. 7, 2021

(51) Int. Cl.
G06F 16/903 (2019.01)
G06F 16/9032 (2019.01)
G06F 16/9035 (2019.01)
G06F 40/30 (2020.01)

(52) U.S. Cl.
CPC .... *G06F 16/90332* (2019.01); *G06F 16/9035* (2019.01); *G06F 16/90344* (2019.01); *G06F 40/30* (2020.01)

(58) Field of Classification Search
None
See application file for complete search history.

(56) References Cited

U.S. PATENT DOCUMENTS

| 7,570,262 | B2 | 8/2009 | Landau et al. | |
| 8,700,619 | B2 | 4/2014 | Wiegering et al. | |
| 9,122,637 | B1* | 9/2015 | Pillai | G06F 16/24565 |
| 9,405,792 | B2 | 8/2016 | Gross | |
| 10,380,195 | B1 | 8/2019 | Zelenov et al. | |
| 2009/0254455 | A1* | 10/2009 | Rothey | G06F 16/838 |
| | | | | 707/999.005 |
| 2011/0060737 | A1* | 3/2011 | Cardella | G06F 16/903 |
| | | | | 707/732 |
| 2013/0311481 | A1* | 11/2013 | Bhatt | G06F 16/245 |
| | | | | 707/741 |
| 2014/0149417 | A1 | 5/2014 | Kim et al. | |
| 2014/0244610 | A1* | 8/2014 | Raman | G06F 16/951 |
| | | | | 707/706 |
| 2014/0358897 | A1* | 12/2014 | Mishra | G06F 16/9537 |
| | | | | 707/722 |

(Continued)

FOREIGN PATENT DOCUMENTS

KR 20140140690 A 12/2014

OTHER PUBLICATIONS

Seol et al. CIKM'14 A Problem-Action Relation Extraction Based on Causality Patterns of Clinical Events in Discharge Summaries, https://dl.acm.org/citation.cfm?id=2661829.2662080 (5 Pages).

(Continued)

*Primary Examiner* — Son T Hoang
(74) *Attorney, Agent, or Firm* — Griffiths & Seaton PLLC

(57) ABSTRACT

An information retrieval response may be augmented, based upon a query, with a plurality of selected causality data relating to the query. The information retrieval response may be generated from an information retrieval system.

14 Claims, 9 Drawing Sheets

(56) References Cited

U.S. PATENT DOCUMENTS

2019/0251171 A1* 8/2019 Inada ............... G06F 16/24578

OTHER PUBLICATIONS

Zhao et al. WSDM'17. Constructing and Embedding Abstract Event Causality Networks from Text Snippets. https://dl.acm.org/citation.cfm?id=3018707 (5 Pages).
Kim et al. CIKM'13. Mining causal topics in text data: iterative topic modeling with time series feedback https://dl.acm.org/citation.cfm?doid=2505515.2505612 (4 Pages).
Chaney and Biei, "Visualizing topic models." In Proceedings of ICWSM, 2012. (4 Pages).
Moraes et. al., Contrasting Search as a Learning Activity with Instructor-designed Learning, CIKM'18. (10 Pages).
Choi and Croft, Time-based Language Models, SIGIR'02. (7 Pages).
Holzmann et. al., On the Applicability of Delicious for Temporal Search on Web Archives. SIGIR'16. (4 Pages).
Ganguly et.al., TopicVis: A GUI for Topic-based Feedback and Navigation, SIGIR 2013. (2 Pages).

* cited by examiner

PROVIDING CAUSALITY AUGMENTED INFORMATION RESPONSES IN A COMPUTING ENVIRONMENT

BACKGROUND OF THE INVENTION

Field of the Invention

The present invention relates in general to computing systems, and more particularly to, various embodiments for providing causality augmented information responses in a computing environment using a computing processor.

Description of the Related Art

The advent of computers and networking technologies have made possible the increase in the quality of life while enhancing day-to-day activities and simplifying the sharing of information. Due to the recent advancement of information technology and the growing popularity of the Internet, a vast amount of information is now available in digital form. Such availability of information has provided many opportunities. Digital and online information such as, for example, communication messaging in real-time has become very popular in recent years. As great strides and advances in technologies come to fruition, the greater the need to make progress in these systems advantageous for efficiency and improvement.

SUMMARY OF THE INVENTION

Various embodiments for providing causality augmented information in a computing environment by a processor are provided. In one embodiment, by way of example only, a method for providing causality augmented information in a computing environment, again by a processor, is provided. An information retrieval response may be augmented, based upon a query, with a plurality of selected causality data relating to the query. The information retrieval response may be generated from an information retrieval system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
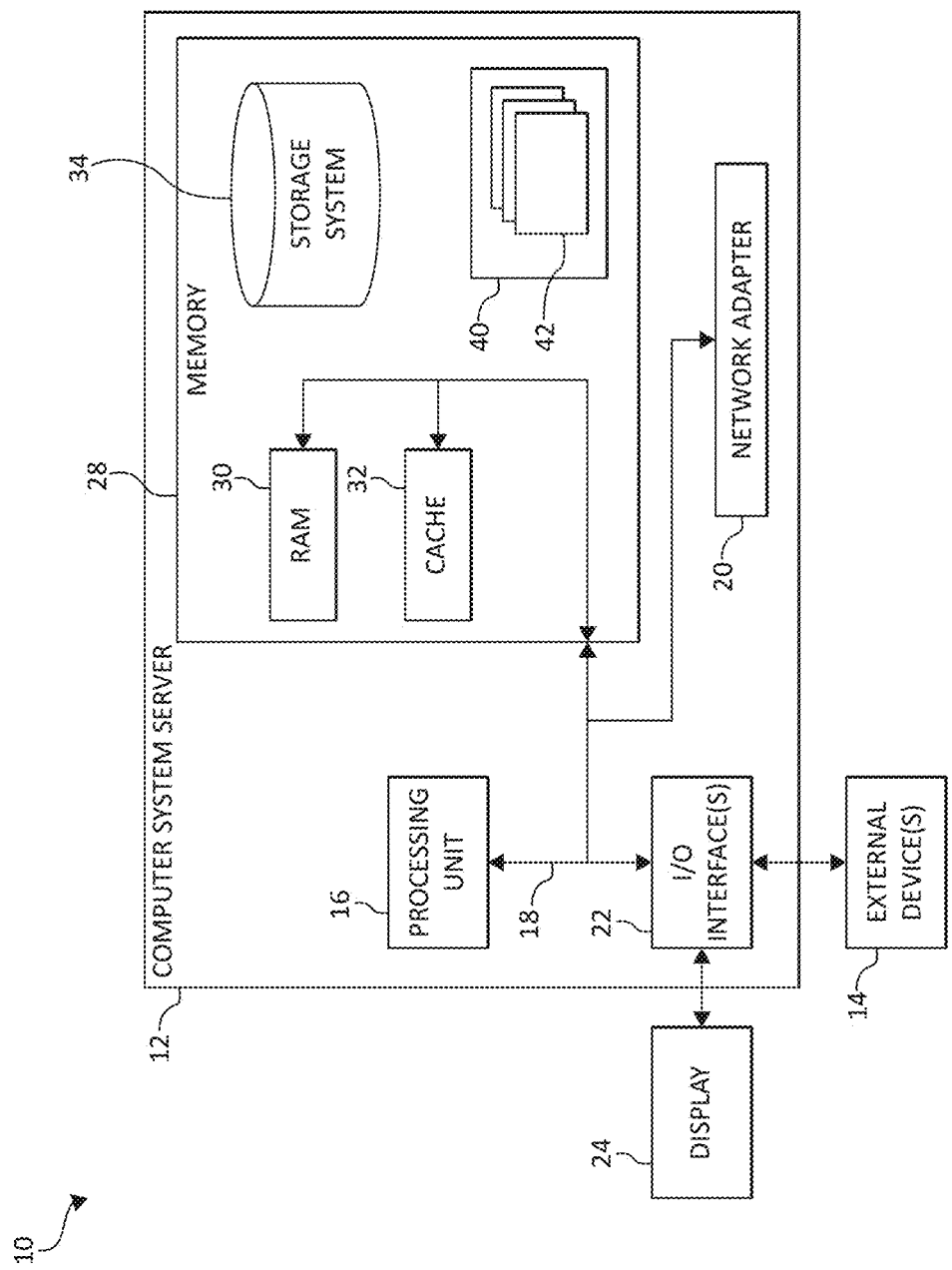
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of various organizations and groups or individuals, including scientific, political, governmental, educational, businesses, and so forth. With the increased use of collaborative and social communication, communication via text-based communication will also increase. For both business and recreational purposes, real-time communication messages (e.g., real-time chat discourses) are part and parcel of modern society. However, for various entities, irrespective of size, using such collaborative and social means of communication can be an overwhelming experience, particularly when large volumes of text-based data are generated by various applications and services.

For example, information retrieval (IR) systems are systems in which users input queries expressing their information need. The IR system's query engine processes the query and matches it against a set of items in a database. This process constitutes the search. Then the IR system returns a hit list, identifying items in the database which best match the query. This list is displayed to the user. The user can request to see one or more of these items, in which case the system displays the contents of those items—in a process called document retrieval. In the broadest terms, IR can refer to relational or other databases where the information is structured in fields, or stored in tables. However, some IR systems concentrate on unstructured items, e.g., documents that are in free text format. These unstructured documents can be text only; text mixed with images; or other multimedia objects.

The query can consist of a simple Boolean expression; an enhanced Boolean expression (with operators for proximity, or wildcards); a string of relevant words and phrases; or full sentences. Some IR systems allow whole documents to serve as queries. These are interpreted by the system as good examples of the desired documents. Additionally, in a web-based information retrieval (IR) system, an end user who wants to view meta (i.e., description) information or the full contents of a stored data item sends a query to a backend system and then utilizes a browser to view the results of the query.

Current research advances and improvements have been made for IR systems in relation to contextualizing the retrieved information for the purpose of making the-content readable in a stand-alone manner. However, current limitations still exist in an IR system such as, for example, given an event (e.g., a drop in value of a currency on April 1st), current IR systems are unable to support retrieval of the possible causes of such event based on the type of query. Said differently, current IR systems fail to augment or enhance information retrieval responses potential causes for a query such as, for example, support, links, and/or evidence of the potential causes for a query.

Accordingly, the present invention provides a novel solution for providing causality augmented information for an IR system. An information retrieval response may be augmented, based upon a query, with a plurality of selected causality data relating to the query. The information retrieval response may be generated from an information retrieval system.

In an additional aspect, an output of an IR system (e.g., from a user query) may be used and augmented with a list of potential causes related to the query. In an additional aspect, a machine learning operation/artificial intelligence ("AI") may be used with an IR system to learn and provide additional value towards an IR system (e.g., a smart search engine search). In this way, the present invention enables increasing/speeding up a root cause analysis of various types of variables and/or events.

In one aspect, the present invention provides for providing causality augmented information responses by using, as input, results of a IR system (e.g., from a user query). A list of potential causes related to the query may be collected, generated, and/or provided. In one aspect, the causality augmented information responses may include providing a visualization of an info box including the following information: a) a query about a particular event, b) a list of sentences explaining the potential causes (ranked by our confidence score, and/or c), a link to the document where the sentence in the list of sentences was retrieved.

Thus, the present invention takes an information retrieval response (e.g., output) of a IR system (e.g., from a user query), performs a root cause analysis operation on various keywords of the information retrieval response, augments the information retrieval response with a list of potential chain of causes related to the query. Given the documents in and/or related to the information retrieval response of the IR system, a potential chain of causes (in the form of phrases) may be extracted. A list of documents causally relevant to the output from may be extracted.

The potential chain of causes and the list of documents causally relevant to the output may be aggregated for the query. A ranked list of potential causes or loop back operations may be performed to create a chain of causes. The chain of causes may be aggregated with a rank list of potential causes.

In general, as used herein, "optimize" or "best" may refer to and/or defined as "maximize," "minimize," or attain one or more specific targets, objectives, goals, or intentions. Optimize may also refer to maximizing a benefit to a user (e.g., maximize a travel benefit). Optimize may also refer to making the most effective or functional use of a situation, opportunity, or resource.

Additionally, "optimize" need not refer to a best solution or result, but may refer to a solution or result that "is good enough" for a particular application, for example. In some implementations, an objective is to suggest a "best" combination documents/potential causes relating to a query, but there may be a variety of factors that may result in alternate suggestion of a combination of documents/potential causes yielding better results. For example, an optimization problem may search for a combination of factors that result in a minimum and/or maximum combination of documents/potential causes. Such factors may include particular documents/potential causes characteristics. Thus, some changes to the variety of factors may result in a jump from one minimum/maximum to another minimum/maximum. In either case, resulting suggestions of documents/potential causes may be considered "good enough," "substantially optimal," and/or "sufficiently good." Herein, the term "optimize" may refer to such results based on minima (or maxima, depending on what parameters are considered in the optimization problem) for suggesting of a combination of documents/potential causes.

In an additional aspect, the terms "optimize" and/or "optimizing" may refer to an operation performed in order to achieve an improved result (e.g., packing travel articles) such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
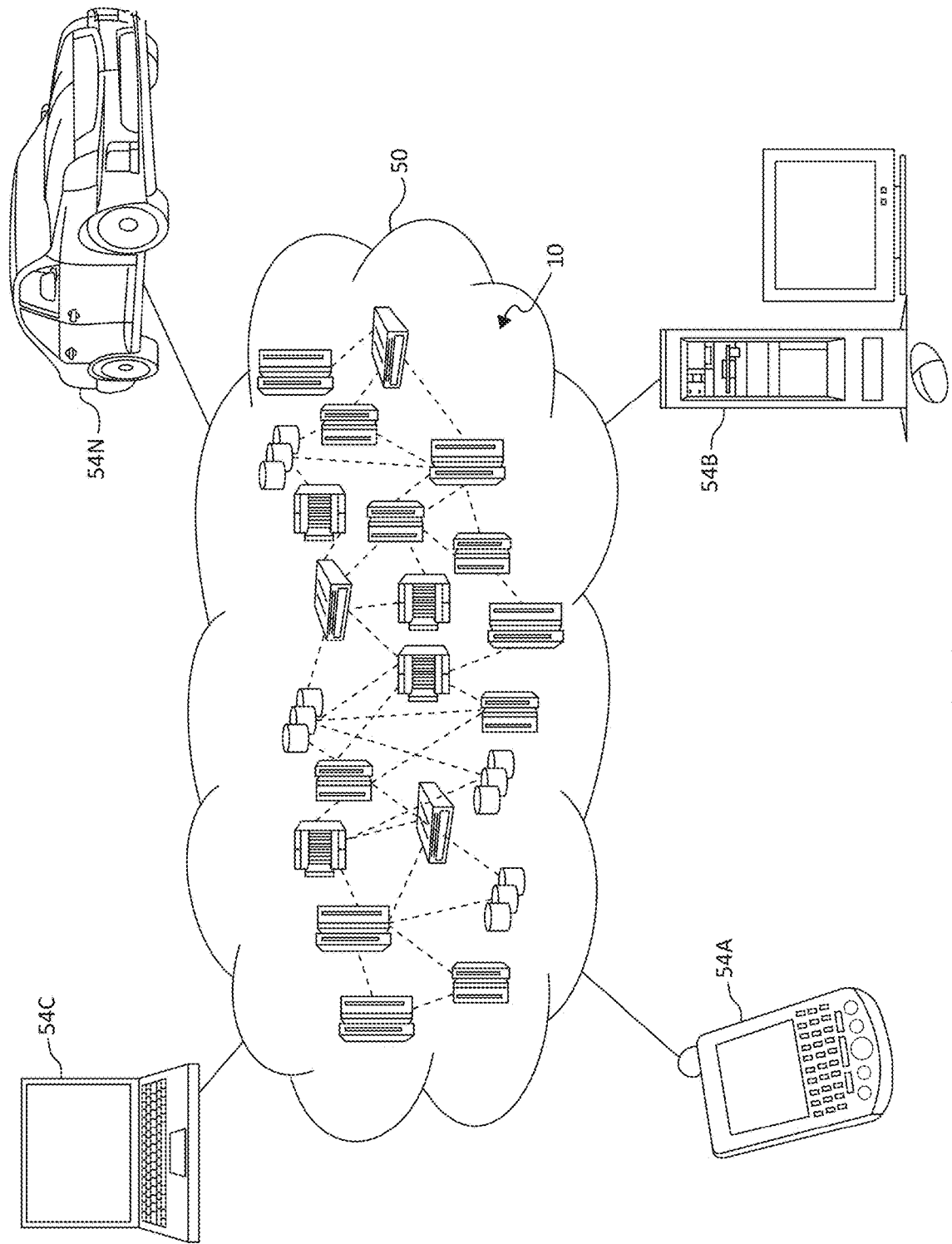
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
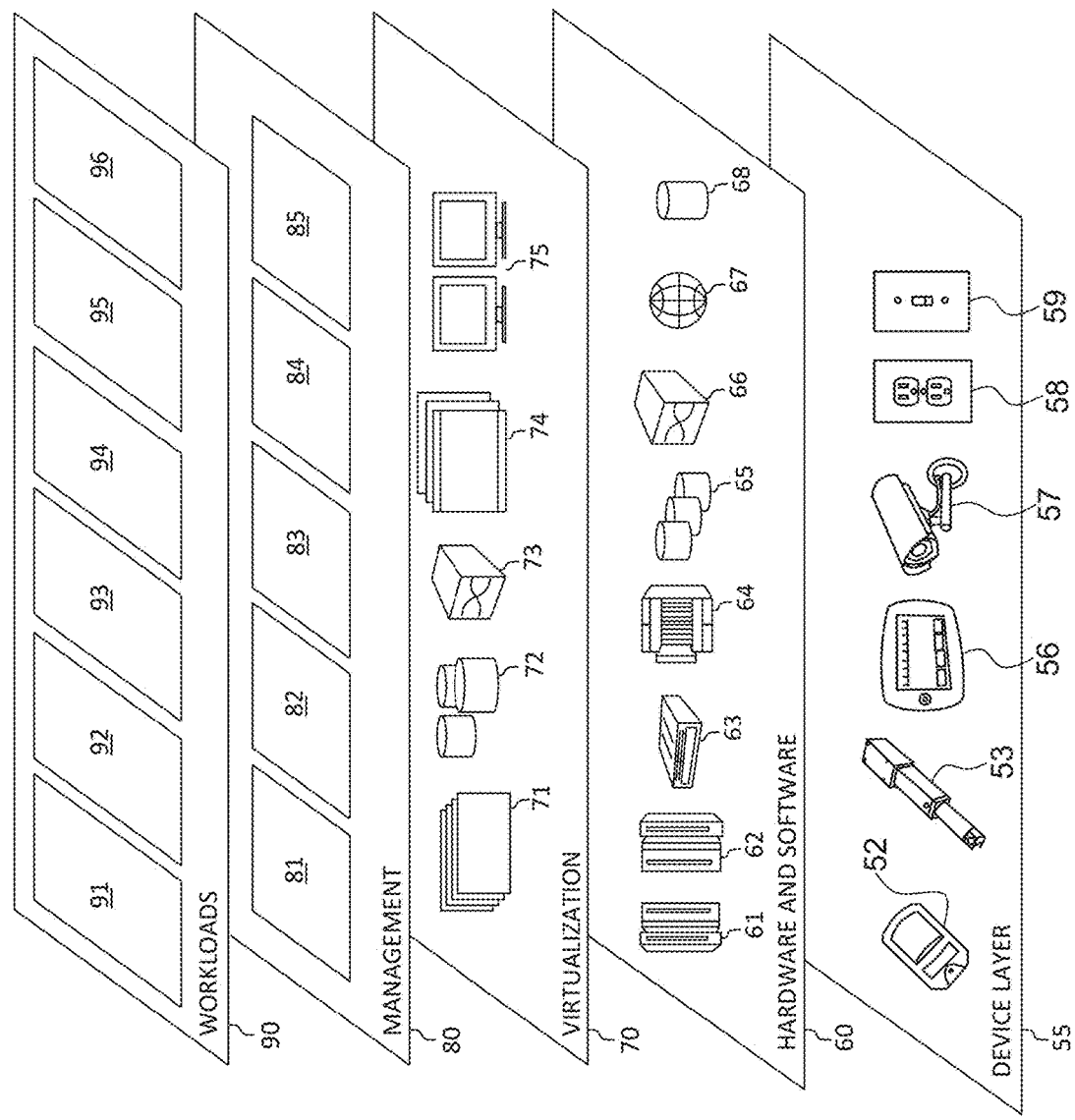
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing causality augmented information responses. In addition, workloads and functions 96 for providing causality augmented information responses may include such operations as data analysis (including data collection and processing from organizational databases, online information, knowledge domains, data sources, and/or social networks/media, and other data storage systems, and predictive and data analytics functions. One of ordinary skill in the art will appreciate that the workloads and functions 96 for providing causality augmented information responses may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

Figure 4:
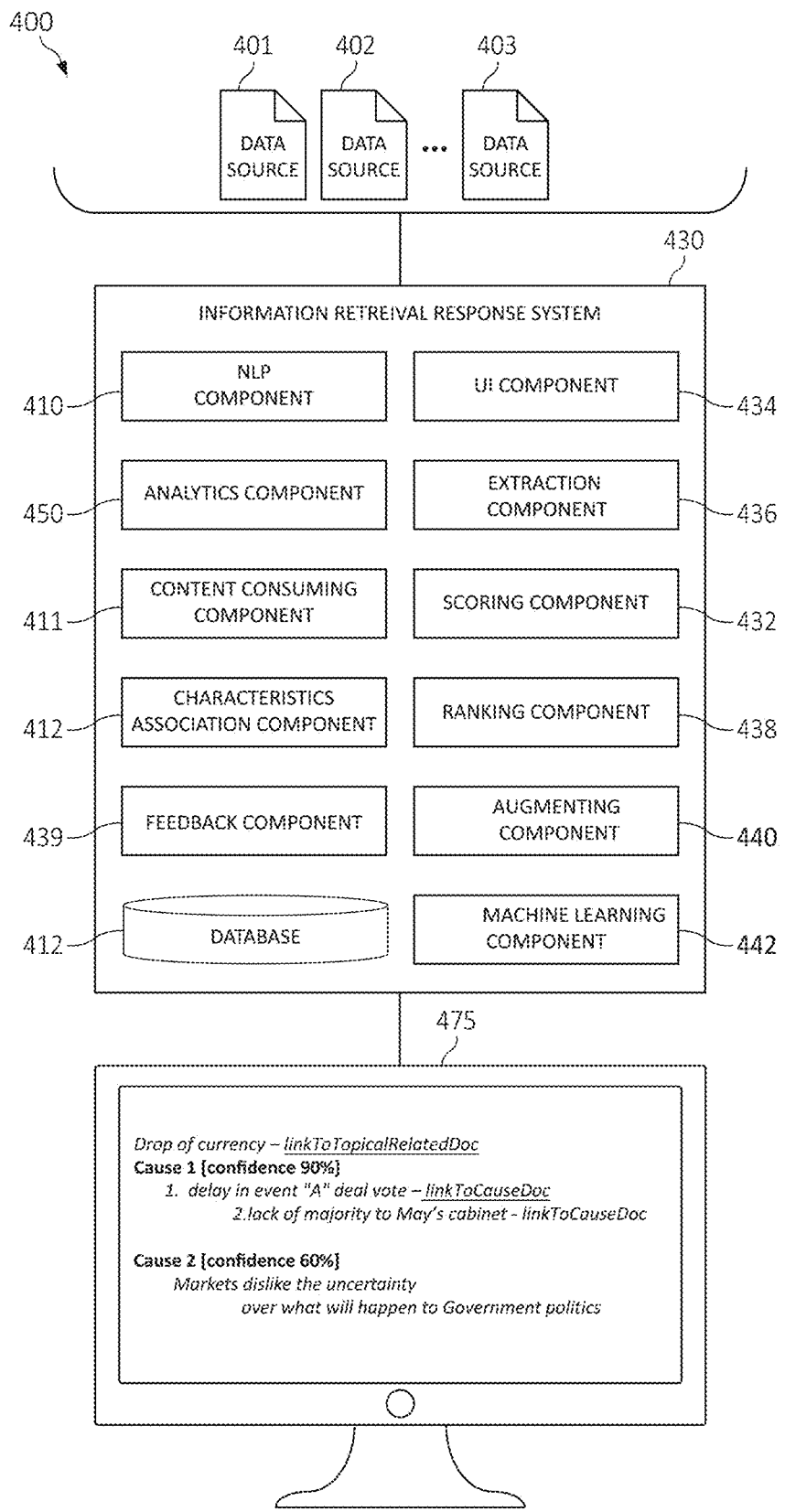
FIG. 4 is an additional block diagram depicting various user hardware and computing components functioning in accordance with aspects of the present invention.

Turning now to FIG. 4, a block diagram of exemplary functionality 400 relating to providing causality augmented information responses is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system in accordance with the present invention, such as those described in FIGS. 1-3. Many of the functional blocks 400 may execute as background processes on various components, either in distributed computing components, or on the user device, or elsewhere.

Multiple data sources 401-403 (e.g., data source 401, data source 402, and/or data sources 403) may be provided by one or more data resources (e.g., cloud computing services, distributed file system, computing databases, etc.). The data sources 401-403 may be provided as a corpus or group of data sources defined and/or identified. The data sources 401-403 may include, but are not limited to, data sources relating to one or more documents, historical records, government records, newspaper articles and images, mapping and geographical records and data, structural data (e.g., buildings, landmark, etc.), musical archive data, books, scientific papers, online journals, journals, articles, drafts, materials related to emails, audio data, images or photographs, video data, and/or other various documents or data sources capable of being analyzed, published, displayed, interpreted, transcribed, or reduced to text data. The data sources 401-403 may be all of the same type, for example, pages or articles in a wiki or pages of a blog. Alternatively, the data sources 401-403 may be of different types, such as word documents, wikis, web pages, power points, printable document format, or any document capable of being analyzed by a natural language processing system.

In addition to text-based documents, other data sources such as audio, video or image sources may also be used wherein the audio, video or image sources may be pre-analyzed to extract or transcribe their content for natural language processing, such as converting from image to text, text to image, or visual recognition and analysis. For example, a photograph combined with a newspaper article and mapping data (e.g., global positioning satellite ("GPS") data) may be analyzed for creating a 3D virtual representation of a particular location at a selected time for providing causality augmented information responses. As an additional example, one or more of the data sources 401-403 may be a media capturing device (e.g., a camera) and image data captured by the data sources 401-403 may be analyzed and be used to assist with providing causality augmented information responses. The group of data sources 401-403 are consumed for an extraction, analysis, and processing, which may also include using natural language processing (NLP) and artificial intelligence (AI) to provide causality augmented information responses.

In one aspect, the data sources 401-403 may be analyzed by an NLP component 410 to data mine, analyze data, transcribe relevant information from the content of the data sources 401-403 (e.g., documents, emails, reports, notes, records, maps, images, video recordings, live-streaming communications, etc.) in order to provide causality augmented information responses and/or provide the information in a more searchable and displayable manner. The NLP component 410 may be provided as a cloud service and/or as a local service.

The information retrieval response system 430 may include the NLP component 410, a content consuming component 411, a characteristics association component 412, a user interface ("UP") component 434, an extraction component 436, a scoring component 432, a ranking component 438, an augmenting component 440, and a machine learning component 442.

In one aspect, the NLP component 410 may be associated with the content consuming component 411. The content consuming component 411 may be used for inputting the data sources 401-403 and running NLP and AI tools against them, learning the content, such as by using the machine learning component 442. It should be noted that other components of FIG. 4 may also employ one or more NLP systems and the NLP component 410 and is merely illustrated by way of example only of use of an NLP system. As the NLP component 410 (including the machine learning component 442) learns different sets of data (e.g., keywords of a query and potential causes related to the keywords, etc.), the characteristics association component 412 (or "intelligent characteristics association component") may use the artificial intelligence to make cognitive associations or links between data sources 401-403 by determining keywords, potential causes, images, landmarks, events, activities, historical data, structures, concepts, methods, features, similar characteristics, underlying common topics, and/or features.

Intelligences or ("intelligent") is the mental process of knowing, including aspects such as awareness, perception, reasoning and judgment. An AI system uses artificial reasoning to interpret the data sources 401-403 and extract their topics, ideas, or concepts. The learned decisions, decision elements, alternatives to the decision, alternative options/choices, decision criteria, concepts, suggestions, topics and subtopics of a domain of interest, may not be specifically named or mentioned in the data sources 401-403 and is derived or inferred by the AI interpretation.

The learned content of the data sources consumed by the NLP system may be merged into a database 420 (and/or knowledge store) or other data storage method of the consumed content with learned causal data (e.g., cause-and-effect relationship, a causal connection based on the conditions of the occurrence of an effect, one or more changes to a variable that impacts one or more alternative variables), events, activities, historical data, structures, concepts, methods, features, similar characteristics, underlying common topics, and/or features of the data sources 401-403 providing association between the content referenced to the original data sources 401-403.

The database 420 may record and maintain the evolution of queries, information retrieval responses, cognitive decisions, alternatives, criteria, subjects, topics, ideas, or content discussed in the data sources 401-403. The database 420 may track, identify, and associate all queries, information retrieval responses, communication threads, messages, transcripts, images, mapping and geographical records and data, structural data (e.g., buildings, landmark, etc.), musical archive data, books, scientific papers, online journals, journals, articles, drafts, materials related to emails, audio data, images or photographs, video data, and/or other various documents of all data generated during all stages of the development or "life cycle" of the queries, information retrieval responses, decisions, decision elements, alternatives, choices, criteria, subjects, topics, or ideas. The merging of the data into one database 420 (which may include a domain knowledge) allows the information retrieval response system 430 to act like a search engine, but in addition to keyword searches, it will use an AI method of making cognitive associations between the data sources using the deduced concepts so as to create and provide causality augmented information responses.

The information retrieval response system 430 may include a user interface ("UP") component 434 (e.g., an interactive graphical user interface "GUI") for providing user interaction for sending or receiving one or more inputs/queries from a user. In one aspect, the UI component 434 may also be included in a computing device 475.

More specifically, the user interface component 434 may be in communication with the computing device 475 (e.g., a wireless communication device) (see also the PDA or cellular telephone 54A, the desktop computer 54B, the laptop computer 54C, and/or the video gaming system 54N of FIG. 2.) for also providing user input for inputting data such as, for example, data sources 401-403 and also providing user interaction for defining a query and/or providing input for enhancing or adjusting the one or more queries, the user input, an analysis operation, unstructured data from the data resources, or a combination thereof to provide causality augmented information responses. The computing device 475 may use the UI component 434 (e.g., GUI) for providing input of data and/or providing a query functionality such as, for example, interactive GUI functionality for enabling a user to enter a query in the computing device 475/UI component 434 relating to query, and/or other parameters, domain of interest, topic, decision, alternative, criteria, or additional analysis. For example, the computing device 475/UI component 434 may display the causality augmented information responses.

In general, the augmenting component 440 may augment an information retrieval response, based upon a query, with a plurality of selected causality data relating to the query from the one or more data sources 401-403. The information retrieval response may be generated from the information retrieval response system 430 and/or an additional information retrieval response system in association with the information retrieval response system 430.

More specifically, the extraction component 436, in association with the content consuming component 411, may extract selected causality data from one or more data sources 401-403 and perform an NLP operation (in association with the NLP component 410) on one or more data sources 401-403 to extract the plurality of selected causality data. Thus, the extraction component 436 may extract the plurality of selected causality data from one or more data sources 401-403 based upon identified keywords in the query.

The scoring component 432 may score each of the plurality of selected causality data according to a degree of relevancy in relation to semantic data extracted from one or more data sources 401-403.

The scoring component 432 may assign a confidence score to each of the plurality of selected causality data indicating degree of confidence the plurality of selected causality data relates to the query.

The ranking component 438 may rank the plurality of selected causality data extracted from one or more data sources in relation to the query. Also, the ranking component 438 may re-rank the plurality of selected causality data based on an assigned confidence score with one or more address links to the one or more data sources.

The UI component 434 may also perform a second query for one or more additional data sources 401-403 relating to the selected causality data. The results of the second query may be linked with the one or more additional data sources. The selected causality data may be aggregated and ranked based upon filtering the one or more additional data sources.

The information retrieval response system 430 may include an analytics component 450 that may be used to analyze data, user input, rank and scored data from the data sources 401-403 (e.g., received from various data resources) along with augmenting an information retrieval response, based upon a query, with selected causality data relating to the query from the data sources 401-403.

A feedback component 439 may also be included in the information retrieval response system 430. For example, the feedback component 439 may collect feedback information from a user relating to the selected causality data.

The information retrieval response system 430 may also include a machine learning component 442. The machine learning component 442 may learn, adjust, teach, or update the selected causality data and/or the provided causality augmented information responses. The machine learning component 442 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In one aspect, the information retrieval response system 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the information retrieval response system 430 may be individual components and/or separate components of the information retrieval response system 430.

Figure 5:
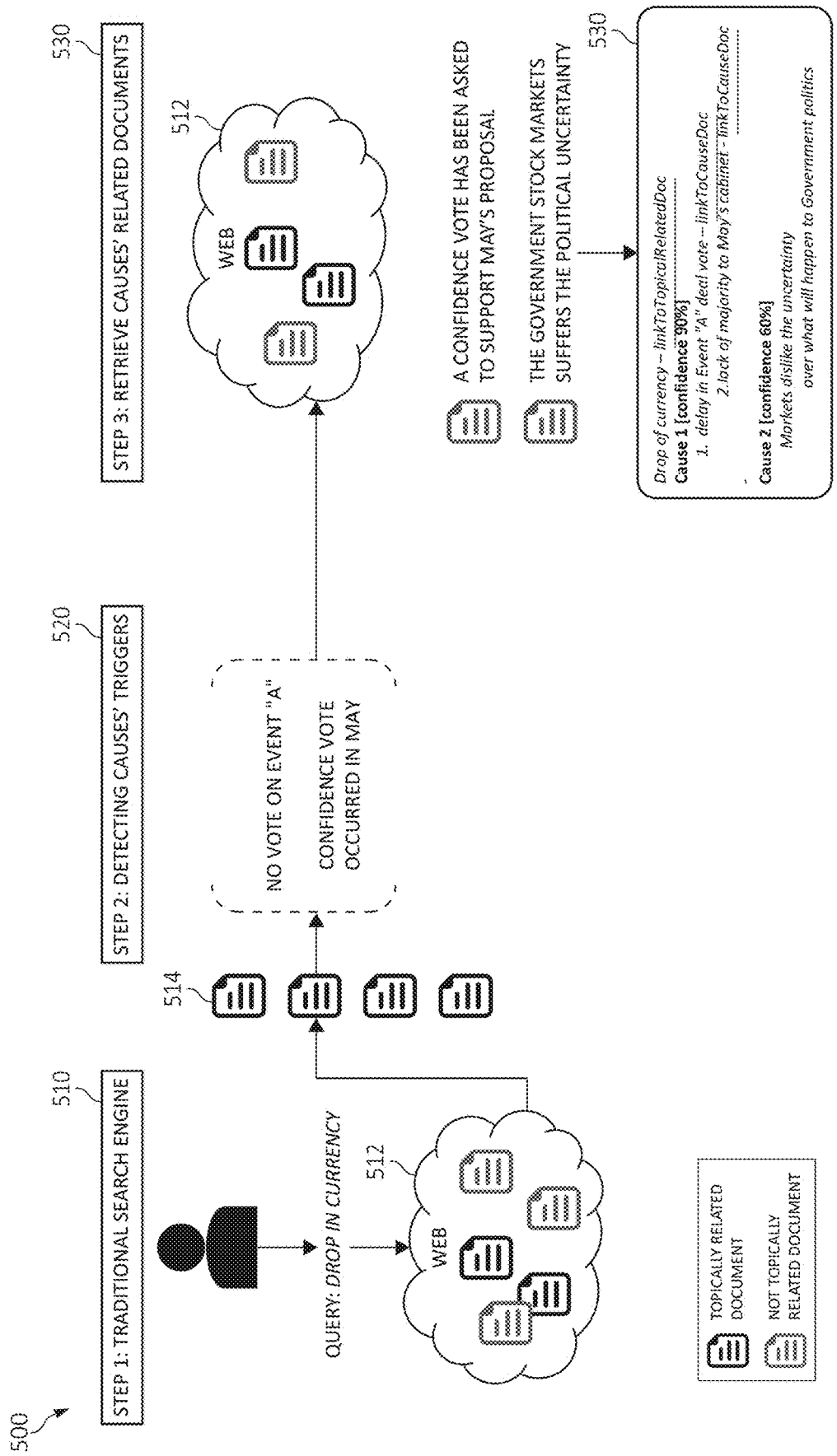
FIG. 5 is an additional block diagram depicting operations for providing causality augmented information responses in accordance with aspects of the present invention.

Turning now to FIGS. 5, diagram 500 depicts operations for providing causality augmented information responses from an information retrieval system. That is, diagram 500 depicts receiving the results of a traditional IR system (e.g., from a classic user query) to provide a list of potential causes related to the query.

In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

As shown, the various blocks of functionality are depicted with arrows designating the steps/blocks' 500 relationships with each other and to show process flow. Additionally, descriptive information is also seen relating each of the functional steps/blocks 500. As will be seen, many of the functional steps/blocks 500 may also be considered "modules" of functionality, in the same descriptive sense as has been previously described in FIG. 4. With the foregoing in mind, the module functional steps/blocks may also be incorporated into various hardware and software components of a system for providing causality augmented information responses from an information retrieval system in accordance with the present invention. Many of the functional steps/blocks 500 may execute as background processes on various components, either in distributed computing components, or on the user device, or elsewhere.

Starting with step 1, as in block 510, a user may provide a query (to an information retrieval system 512 or "search engine") such as, for example, a query relating a query relating to a particular event (e.g., a query relating to a "drop in currency"). An output may be generated from the information retrieval system or "search engine" and may include a topic list of related documents 514 (e.g., topically related documents).

In step 2, as in block 520, one or more potential causes relating to one or more keywords of the query (e.g., drop, currency,) may be detected such as, for example, "no vote on event A" or "confidence vote occurred in May". The detection operations may include taking/receiving as input topically related documents (obtained in step 1). The detection operations may analyze, identify, and return keywords that have a high probability (e.g., greater than a defined percentage or threshold) of being related to the causes associated with the query.

In step 3, as in block 530, one or more causes' related documents may be identified, accessed, and/or retrieved. That is, in step 1, based upon the keywords from step 2, one or more matching documents (a list of causes) (e.g. a document/articled titled "A confidence vote has been asked to support May's proposal"), may be retrieved. Step 3 may also include associating each cause with the input query and assigning a confidence score to the cause in relation to relevancy to the input query. For example, a first cause ("cause 1") may indicate "delay in event A deal vote" caused "drop in current" with 90% confidence or second cause ("cause 2") may indicate "markets dislike the uncertainty over what will happen with government politics" with a 60% confidence score). Step 3 may also include providing a list of causes related to the input query.

Figure 6:
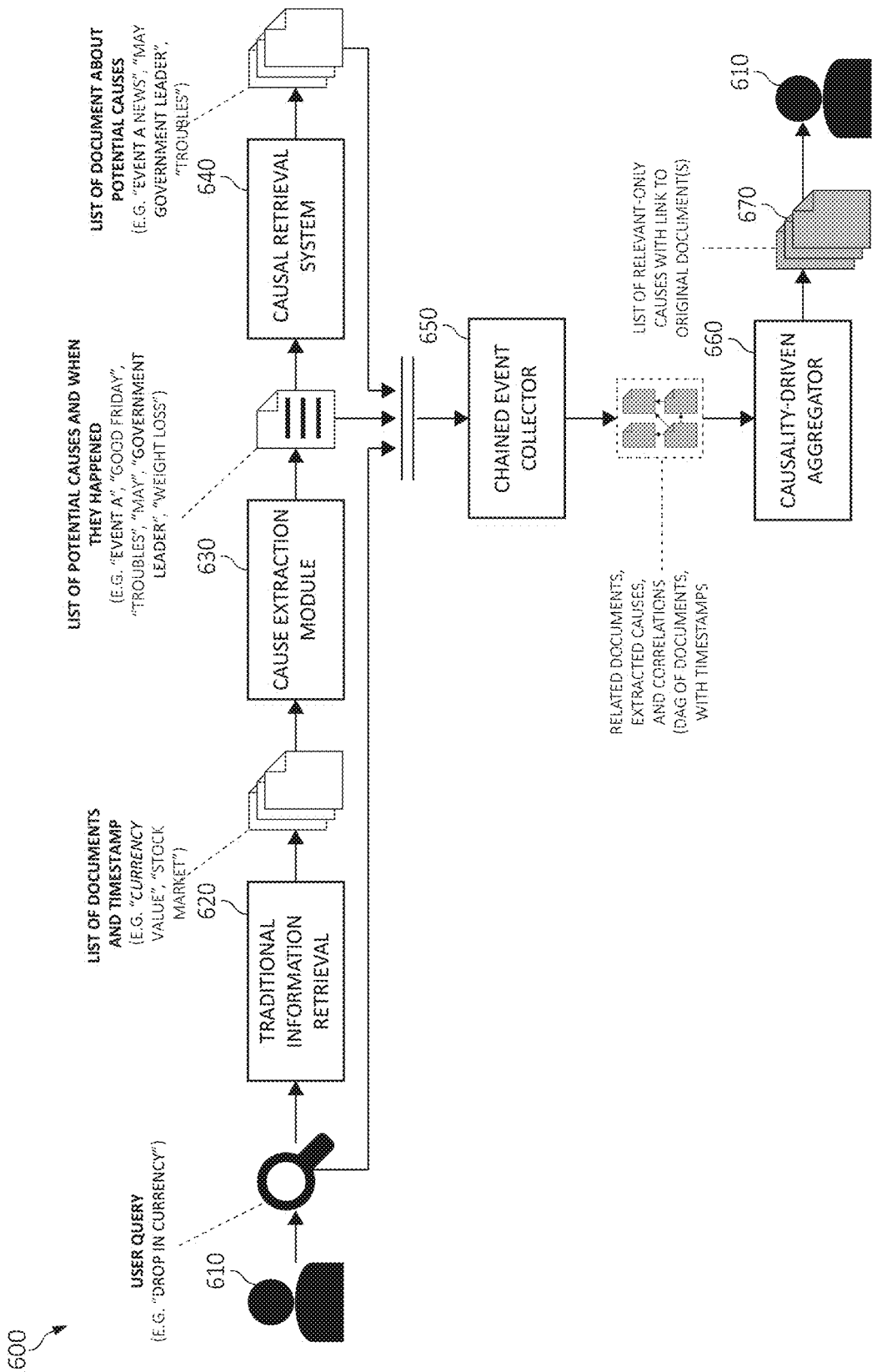
FIG. 6 is an additional block diagram depicting operations for providing causality augmented information responses in accordance with aspects of the present invention.

Turning now to FIG. 6, an additional block diagram 600 depicts operations for providing causality augmented information responses from an information retrieval system. In one aspect, one or more of the components, modules, services, applications, and/or functions described in FIGS. 1-5 may be used in FIG. 6. Repetitive description of like elements, components, modules, services, applications, and/or functions employed in other embodiments described herein is omitted for sake of brevity.

Again, as in FIG. 6, the various blocks of functionality are depicted with arrows designating the steps/blocks' 600 relationships with each other and to show process flow.

Additionally, descriptive information is also seen relating each of the functional steps/blocks 600. As will be seen, many of the functional steps/blocks 500 may also be considered "modules" of functionality, in the same descriptive sense as has been previously described in FIGS. 1-5. With the foregoing in mind, the module functional steps/blocks may also be incorporated into various hardware and software components of a system for image enhancement in accordance with the present invention. Many of the functional steps/blocks 500 may execute as background processes on various components, either in distributed computing components, or on the user device, or elsewhere.

Starting with block 620, an information retrieval component may receive a query (e.g., as input such as, for example, "drop in currency") from a user 610 and then search, identify, locate, retrieve, and/or a list of documents related to the user query (e.g., a list of documents and timestamp such as, for example, "currency value," "stock market", etc.)

In block 630, a cause extraction component (e.g., a causality extraction module) may extract (from the list of documents/taking as input the list of documents) one or more potential causes (in the form of phrases). For example, the cause extraction component may take as input the list of documents ("Ds") related to a query ("q"). For each document ("d") in the list of documents ("Ds"), one or more sentences ("Ss") may be extracted. For each sentence in the group of sentences Ss, a model M(s,q) (e.g., a machine learning model) may be used to obtain a confidence score indicating how causally-related is the sentence list of documents ("Ds"). A sample realization of model M may be performed with the assistance/help of a supervised (e.g., feature based, e.g., "caused by," or "led to") or semi-supervised (ontology-driven) operation. Thus, the cause extraction component may provide a list of causally relevant phrases ("Cs") (e.g., a list of potential causes and when they occurred/happened such as, for example, "cessation," "good Friday," "troubles," "May," "Government leader" or "weight loss.")

In block 640, a causal retrieval system may use as input a list of phrases (e.g., the causally relevant phrases ("Cs") and a list of the list of documents ("Ds") related to a query ("q") (e.g., the output of the causality extraction module of block 630). The causal retrieval system may estimate an aggregated term distribution ("EQ") from causally relevant phrases ("Cs") and list of documents ("Ds") so as to explore along possible directions of the relevant causes (e.g., "event A") in the context of the query event (e.g., drop in currency value). The causal retrieval system may use the aggregated term distribution ("EQ") to retrieve a list of documents about potential causes ("CDs") and generate the potential causes ("CDs"). Thus, the causal retrieval system may generate/provide a list of documents about one or more potential causes relating to the query (e.g., articles "Event A news," "May Government leader," and "troubles").

In block 650, a chain event collector may use as input 1) a query ("q"), a list of causes/list of causally relevant phrases ("Cs") (from the output of the causality extraction module of block 630), b) a list of causally related documents/list of documents about potential causes ("CDs") (e.g., the output of the causal retrieval system of block 640).

In operation, the chain event collector may create and keep a graph (e.g., an acyclic graph (where a node is equal to a document with causes in the document). At first iteration, the graph may be empty with no edges are available yet. The graph may be progressively populated through documents searches triggered by the chain event collector itself. Thus, from the second iteration on, each node in the graph starts to be connected.

Figure 7:
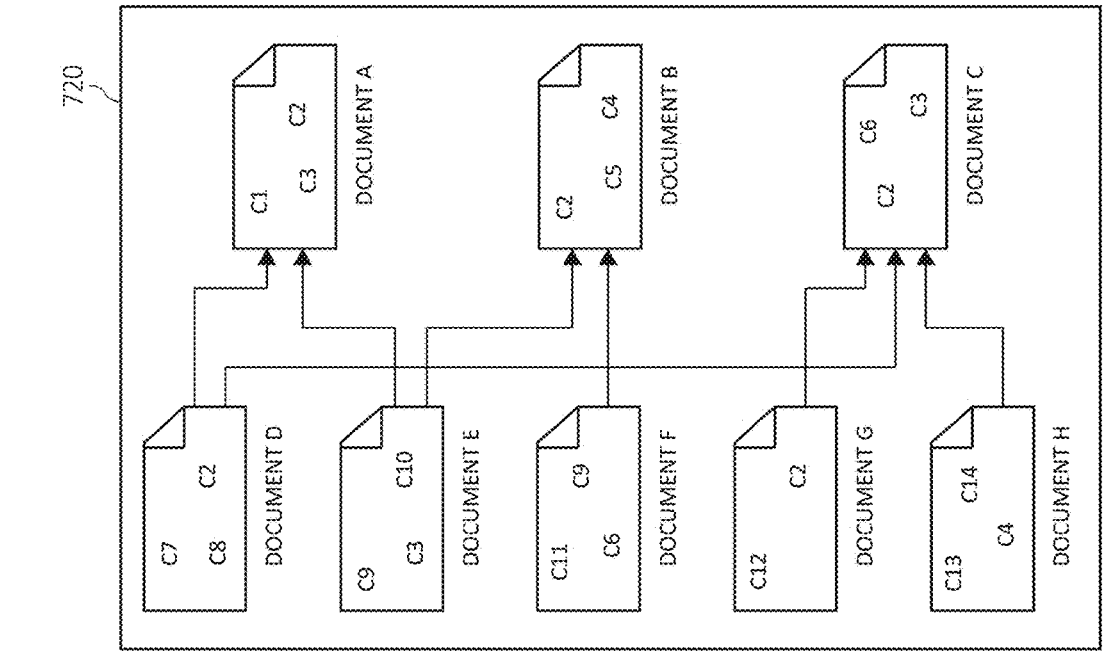
FIG. 7 is an additional block diagram depicting operations for operations of a chain event collector for providing causality augmented information responses in accordance with aspects of the present invention.

For example, as depicted in FIG. 7, which depicts an internal state example of the chain event collector 710 (and various iterations results 720), in a first iteration, the chain event collector 710 may receive document A, B, and C. At second iteration, (1) document A triggers a search with document D and E in the result, (2) document B triggered a search with document E and F in the result, (3) document C triggered a search with document D, G, H in the result. Thus, as depicted more clearly in FIG. 7, document A, B and C are the results of the first iteration. Document D, E, F, G, H are the results of the second iteration, where the Chain Event Collector triggered a new search. Each document keeps/maintains the causes. Edges among documents represent a relationship (who triggered a new search). Given the causality relationship, the documents may also be sorted in time (e.g., document D has been published before document A).

Additionally, search results may have multiple parent documents, as depicted in FIG. 7). The chain event collector 710 may analyze and check whether there are additional documents about potential causes ("CDs") (CDs equal nodes in the graph). If there are additional documents about potential causes ("CDs"), the chain event collector may loop back to the list of retrieved documents. If there are no additional documents about potential causes ("CDs"), the chain event collector may output to the created graph (e.g., the acyclic graph of causally related documents) to the causality-driven aggregator component for block 660. That is, the chain event collector may output a graph of related documents, extracted causes, and correlations (DAG of documents, with timestamps).

In block 660, the causality-driven aggregator component, uses as input, the acyclic graph of causally related document (e.g., output of the chain event collector of block 650).

In operation, the causality-driven aggregator component 660 may select the most connected nodes in the graph (e.g., those most relevant and connected documents), which may be referred to herein as a subset "FinalDocs." The causality-driven aggregator component 660 may rank the list of phrases/list of causally relevant phrases ("Cs") based on aggregating evidences from the documents in subset "Final-Docs." in the context of the query ("q"). For example, the causality-driven aggregator component 660 may use the retrieval scores of a document ("d") in the subset "Final-Docs." and overlap information of terms in document ("d") (e.g. "event A influence on government A's economy") with those in query ("q") ("drop in currency") and causes ("c") in list of phrases/list of causally relevant phrases ("Cs") ("event A"). Thus, the causality-driven aggregator component 660 may output/produce a re-ranked list of phrases with confidence scores and links (e.g., address links such as, for example, a uniform resource locator "URL") to the documents containing re-ranked list of phrases. That is, the causality-driven aggregator component 660 may output/produce (for user 610) a list of relevant-only causes 670 with links/connections to the originally identified data source (e.g., document).

Figure 8:
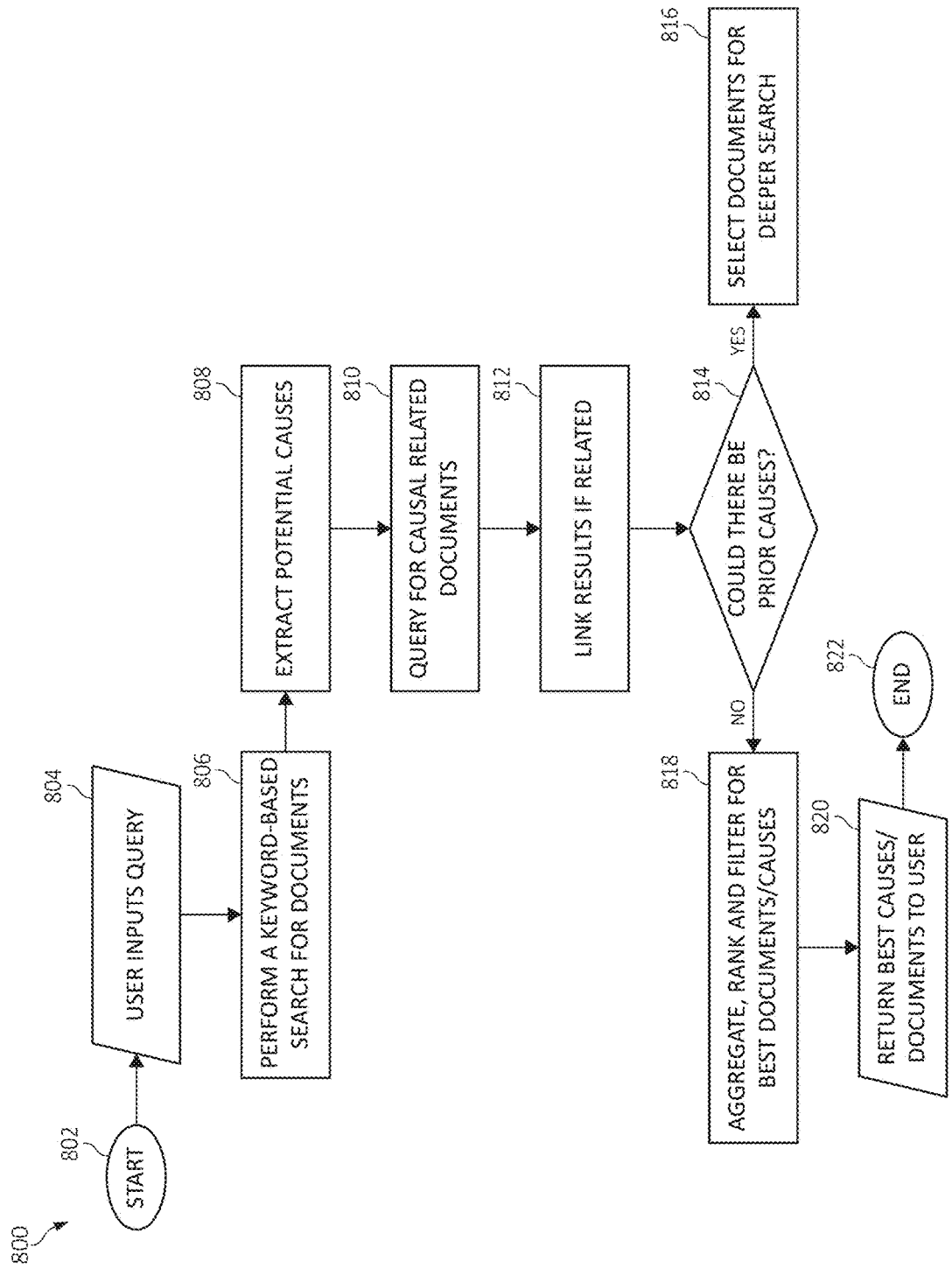
FIG. 8 is a flowchart diagram depicting an exemplary method for providing causality augmented information responses by a processor.

Turning now to FIG. 8, a method 800 for providing causality augmented information responses by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

An query may be received as input (e.g., a user inputs a query), as in block 804. A keyword-based search (e.g., identified keywords from the query) may be performed for locating and retrieving one or more documents (from one or more data sources), as in block 806. One or more potential causes may be extracted, as in block 808. A query (e.g., an additional query) may be performed for causal related documents, as in block 810. Each of the results to the query may be linked (e.g., linked via an address link such as, for example, a uniform resource locator "URL") to the source of the results, as in block 812.

In block 814, a determination operation may be performed to determine if there are prior causes (e.g., historical causes related to the original query). If yes at block 814, one or more documents may be selected for an additional search (e.g., a more exhaustive and expansive search for potential causes relating to the query), as in block 816. If not at block 814, those of the located and retrieved documents may be aggregated, ranked, and filtered for the documents (e.g., optimized/best documents) being most related to the potential causes (e.g., optimized documents and causes), as in block 818. The best/optimized documents and causes may be returned to a user (e.g., displayed via a GUI to a user), as in block 820. The functionality 800 may end in block 822.

Figure 9:
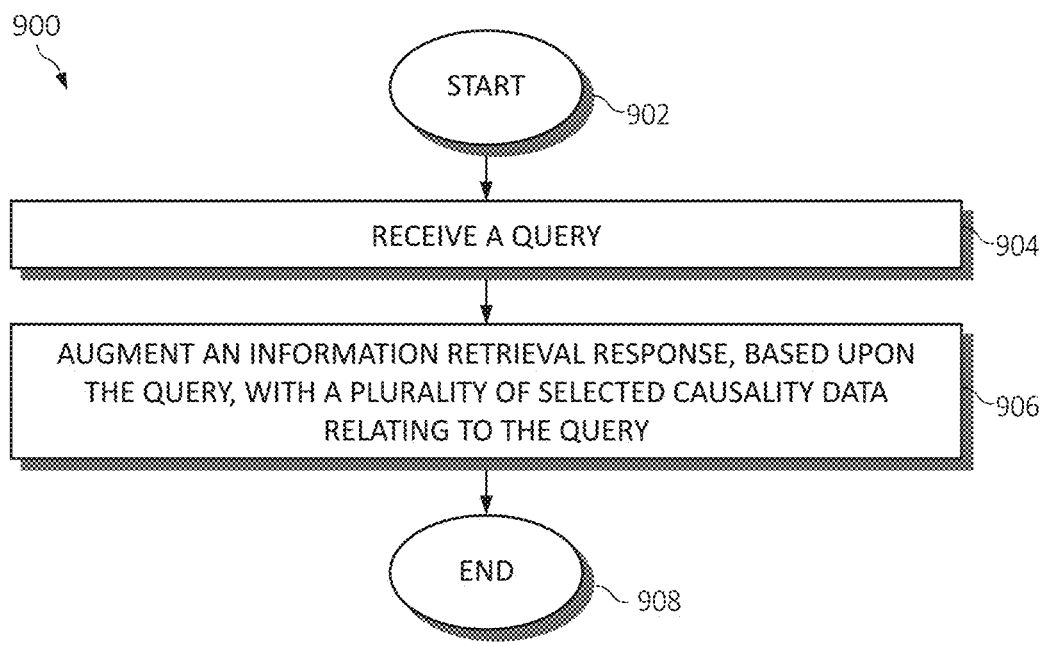
FIG. 9 is an additional flowchart diagram depicting an exemplary method for providing causality augmented information responses by a processor; again, in which aspects of the present invention may be realized.

Turning now to FIG. 9, a method 900 for providing causality augmented information responses by a processor is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902.

A query may be received (such as, for example, in an information retrieval system), as in block 904. An information retrieval response may be augmented, based upon a query, with a plurality of selected causality data relating to the query, as in block 906. The information retrieval response may be generated from an information retrieval system. The functionality 900 may end in block 908.

In one aspect, in conjunction with and/or as part of at least one block of FIGS. 8-9, the operations of 800 and 900 may include one or more of each of the following. The operations of 800 and 900 may extract the plurality of selected causality data from one or more data sources. The operations of 800 and 900 may perform a natural language processing ("NLP") operation on one or more data sources to extract the plurality of selected causality data.

The operations of 800 and 900 may score each of the plurality of selected causality data according to a degree of relevancy in relation to semantic data extracted from one or more data sources, and/or assign a confidence score to each of the plurality of selected causality data indicating degree of confidence the plurality of selected causality data relates to the query.

The operations of 800 and 900 may rank the plurality of selected causality data extracted from one or more data sources in relation to the query or re-rank the plurality of selected causality data based on an assigned confidence score with one or more address links to the one or more data sources.

The operations of 800 and 900 may extract the plurality of selected causality data from one or more data sources based upon identified keywords in the query, perform a second query for one or more additional data sources relating to the plurality of selected causality data, link results from the second query with the one or more additional data sources, and aggregate and rank the plurality of selected causality data based upon filtering the one or more additional data sources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks that may be shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing causality augmented information in a computing environment by a processor, comprising:
augmenting an information retrieval response, based upon a query, with a plurality of selected causality phrases relating to the query and extracted from one or more data sources based on identified keywords in the query, wherein the information retrieval response is generated from an information retrieval system, and each causality phrase indicates at least one potential cause for the query;
responsive to identifying that the one or more data sources include causality phrases relating to the query, performing a second query for one or more additional data sources different from the one or more data sources relating to the plurality of selected causality data using the causality phrases in the one or more data sources as input to the second query, wherein additional queries subsequent to the second query are iterated through based upon respective causality phrases identified in a previous query;
updating the plurality of selected causality phrases with at least one causality phrase resulted from the second query;
aggregating and ranking the plurality of updated causality phrases based upon filtering the one or more additional data sources, wherein the ranking indicates a confidence score of relevancy to the search query for each of the plurality of updated causality phrases; and
displaying the plurality of updated causality phrases appended to the information retrieval response of the query based on the ranking.

2. The method of claim 1, further including extracting additional causality phrases from the one or more data sources.

3. The method of claim 1, further including performing a natural language processing ("NLP") operation on the one or more data sources to extract the plurality of selected causality phrases.

4. The method of claim 1, further including scoring each of the plurality of selected causality phrases according to a degree of relevancy in relation to semantic data extracted from the one or more data sources.

5. The method of claim 1, further including:
ranking the plurality of selected causality phrases extracted from the one or more data sources relating to the query; or
re-ranking the plurality of selected causality phrases based on an assigned confidence score with one or more address links to the one or more data sources.

6. A system for providing causality augmented information in a computing environment, comprising:
one or more computers with executable instructions that when executed cause the system to:
augment an information retrieval response, based upon a query, with a plurality of selected causality phrases relating to the query and extracted from one or more data sources based on identified keywords in the query, wherein the information retrieval response is generated from an information retrieval system, and each causality phrase indicates at least one potential cause for the query;
responsive to identifying that the one or more data sources include causality phrases relating to the query, perform a second query for one or more additional data sources different from the one or more data sources relating to the plurality of selected causality data using the causality phrases in the one or more data sources as input to the second query, wherein additional queries subsequent to the second query are iterated through based upon respective causality phrases identified in a previous query;

update the plurality of selected causality phrases with at least one causality phrase resulted from the second query;

aggregate and rank the plurality of updated causality phrases based upon filtering the one or more additional data sources, wherein the ranking indicates a confidence score of relevancy to the search query for each of the plurality of updated causality phrases; and display the plurality of updated causality phrases appended to the information retrieval response of the query based on the ranking.

7. The system of claim 6, wherein the executable instructions when executed cause the system to extract additional causality phrases from the one or more data sources.

8. The system of claim 6, wherein the executable instructions when executed cause the system to perform a natural language processing ("NLP") operation on the one or more data sources to extract the plurality of selected causality phrases.

9. The system of claim 6, wherein the executable instructions when executed cause the system to score each of the plurality of selected causality phrases according to a degree of relevancy in relation to semantic data extracted from the one or more data sources.

10. The system of claim 6, wherein the executable instructions when executed cause the system to:
rank the plurality of selected causality phrases extracted from the one or more data sources relating to the query; or
re-rank the plurality of selected causality phrases based on an assigned confidence score with one or more address links to the one or more data sources.

11. A computer program product for, by a processor, providing causality augmented information in a computing environment, the computer program product comprising a non-transitory computer-readable storage medium having computer-readable program code portions stored therein, the computer-readable program code portions comprising:

an executable portion that augments an information retrieval response, based upon a query, with a plurality of selected causality phrases relating to the query and extracted from one or more data sources based on identified keywords in the query, wherein the information retrieval response is generated from an information retrieval system, and each causality phrase indicates at least one potential cause for the query;

an executable portion that, responsive to identifying that the one or more data sources include causality phrases relating to the query, performs a second query for one or more additional data sources different from the one or more data sources relating to the plurality of selected causality data using the causality phrases in the one or more data sources as input to the second query, wherein additional queries subsequent to the second query are iterated through based upon respective causality phrases identified in a previous query;

an executable portion that updates the plurality of selected causality phrases with at least one causality phrase resulted from the second query;

an executable portion that aggregates and ranks the plurality of updated causality phrases based upon filtering the one or more additional data sources, wherein the ranking indicates a confidence score of relevancy to the search query for each of the plurality of updated causality phrases; and an executable portion that displays the plurality of updated causality phrases appended to the information retrieval response of the query based on the ranking.

12. The computer program product of claim 11, further including an executable portion that extracts additional causality phrases from the one or more data sources.

13. The computer program product of claim 11, further including an executable portion that:
performs a natural language processing ("NLP") operation on the one or more data sources to extract the plurality of selected causality phrases; and
scores each of the plurality of selected causality phrases according to a degree of relevancy in relation to semantic data extracted from the one or more data sources.

14. The computer program product of claim 11, further including an executable portion that:
ranks the plurality of selected causality phrases extracted from the one or more data sources relating to the query; or
re-ranks the plurality of selected causality phrases based on an assigned confidence score with one or more address links to the one or more data sources.

* * * * *